(12) United States Patent
Hartley et al.

(10) Patent No.: US 7,343,225 B2
(45) Date of Patent: Mar. 11, 2008

(54) METHOD FOR REDUCING OFF-GRADE PRODUCT PRODUCTION DURING REACTION TRANSITIONS

(75) Inventors: Ivan J. Hartley, Victoria, TX (US); John R. Parrish, Cross Lanes, WV (US); Rich John Stolz, Baytown, TX (US)

(73) Assignee: Univation Technologies, LLC, Houston, TX (US)

( * ) Notice: Subject to any disclaimer, the term of this patent is extended or adjusted under 35 U.S.C. 154(b) by 427 days.

(21) Appl. No.: 11/145,349

(22) Filed: Jun. 3, 2005

(65) Prior Publication Data

US 2006/0276603 A1      Dec. 7, 2006

(51) Int. Cl.
*G05B 21/00* (2006.01)
*C08F 2/00* (2006.01)

(52) U.S. Cl. .................. 700/266; 700/269; 526/59; 526/901

(58) Field of Classification Search ........... 526/59, 526/901; 700/269, 266
See application file for complete search history.

(56) References Cited

U.S. PATENT DOCUMENTS

| 5,627,242 | A | 5/1997 | Jacobsen et al. | 526/60 |
|---|---|---|---|---|
| 6,388,027 | B1 * | 5/2002 | Zilker et al. | 526/82 |
| 6,846,884 | B2 | 1/2005 | Parrish et al. | 526/73 |
| 2005/0020784 | A1 | 1/2005 | Noll | |

FOREIGN PATENT DOCUMENTS

| WO | WO 93/24533 | 12/1993 |
|---|---|---|
| WO | WO 03/022888 | 3/2003 |
| WO | WO 2004/029108 | 4/2004 |

OTHER PUBLICATIONS

McAuley, K.B., et al., "Optimal Grade Transitions in a Gas Phase Polyethylene Reactor," *AIChE Journal*, Oct. 1992 vol. 38, No. 10, pp. 1564-1576.

* cited by examiner

*Primary Examiner*—Fred Teskin
(74) *Attorney, Agent, or Firm*—Kevin M. Faulkner; Leandro Arechederra

(57) ABSTRACT

In some embodiments, a method for determining initial conditions for a transition from an initial reaction to a target reaction to minimize (or substantially minimize) the amount of off-grade material produced during the transition, and optionally also process control variables for implementing the transition. Some embodiments also include the steps of setting the reaction conditions to determined initial conditions and then implementing the transition. In some embodiments, a product property that can cause production of more off-grade product during the transition than can any other of the properties is identified as a primary property, and process control variables for implementing the transition are determined so that the product produced during the transition goes off-grade due to the primary property, and due to each of at least one other product property, at the same or substantially the same time, and preferably also so that each non-primary property reaches a value compliant with the target specification set as late as possible but not later than the time the primary property reaches a value compliant with the target specification set.

31 Claims, 9 Drawing Sheets

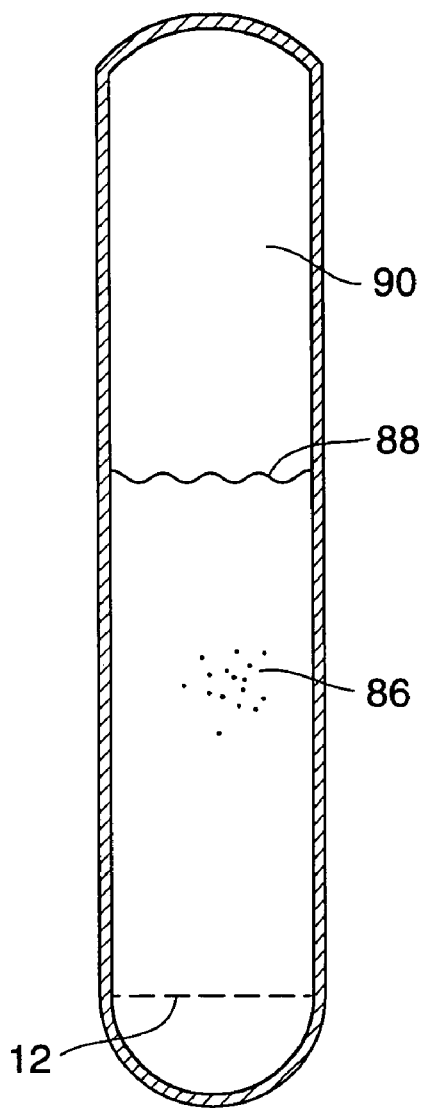
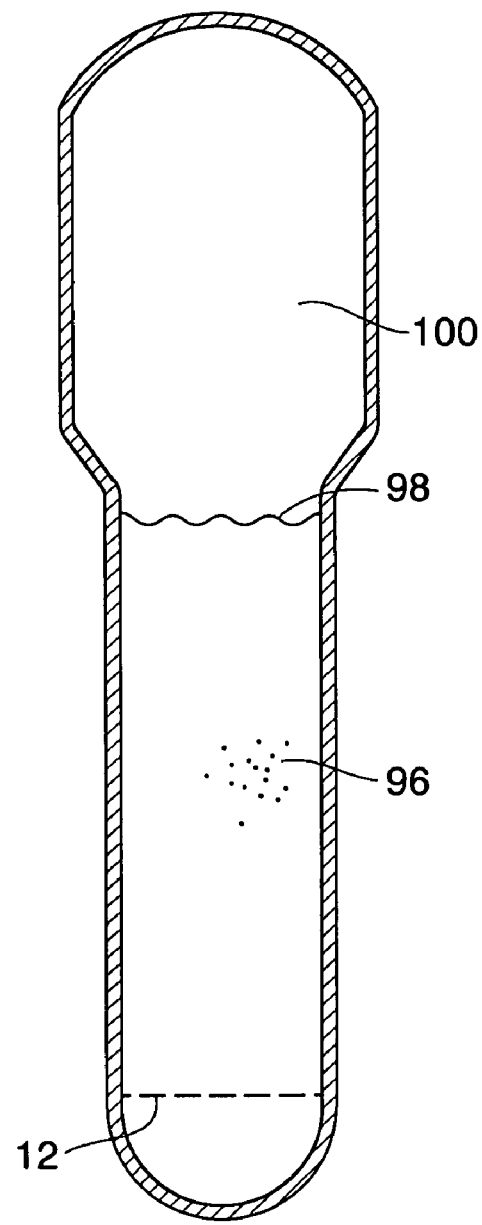
FIG. 2   FIG. 3

METHOD FOR REDUCING OFF-GRADE PRODUCT PRODUCTION DURING REACTION TRANSITIONS

FIELD OF THE INVENTION

The invention pertains to methods for controlling reactions (e.g., olefin polymerization reactions) to implement transitions from an initial reaction (in which a product is produced to meet a first specification set) to a target reaction (in which the product is produced to meet a second specification set). More particularly, the invention pertains to methods for reducing (or minimizing) the amount of off-grade product produced while implementing such a transition.

BACKGROUND OF THE INVENTION

With reference to a product being produced by a continuous reaction, the expression "instantaneous" value of a property of the product herein denotes the value of the property of the most recently produced quantity of the product. The most recently produced quantity typically undergoes mixing with previously produced quantities of the product before a mixture of the recently and previously produced product exits the reactor. In contrast, with reference to a product being produced by a continuous reaction, "average" (or "bed average") value (at a time "T") of a property herein denotes the value of the property of the product that exits the reactor at time T.

Throughout this disclosure, the abbreviation "MI" denotes melt index and the abbreviation "FI" denotes flow index.

Throughout this disclosure, including in the claims, the phrase "off-grade product" (e.g., "off-grade" polymer resin) assumes that the product is produced in a reactor with the intention that it meet a specification set (a set of one or more specifications for one or more properties of the product) and denotes that the product has at least one property that does not meet at least one specification in the specification set. For example, if the specification set requires that the product have a resin flow property (e.g., MI) within a specified first range and a density within a specified density range, the product is an off-grade product if its resin flow property (e.g., melt index) is outside the first range and/or its density is outside the density range.

Throughout this disclosure, including in the claims, the phrase "time constant" for change of a product property during a transition is used in a broad sense to denote one or more parameters that determine how rapidly the property changes during the transition, or determine the product's trajectory (value as a function of time) during the transition. Although a property is described herein as changing with a "time constant" during the transition, this does not necessarily imply that the property changes exponentially (e.g., as $K\ e^{-t/T}$, where K is an initial value at the start of the transition constant, the time parameter $t=0$ at the start of the transition, and T is a time constant), although in some embodiments of the invention one or more product properties may change exponentially during the transition. Although a property is described herein as changing with a "time constant" during the transition, this does not necessarily imply that the property changes at a rate that is either fixed or time varying.

One commonly used method for producing polymers is gas phase polymerization. A conventional gas phase fluidized bed reactor, during operation to produce polyolefins by polymerization, contains a fluidized dense-phase bed including a mixture of reaction gas, polymer (resin) particles, catalyst, and catalyst modifiers. Typically, any of several process control variables can be controlled to cause the reaction product to have desired characteristics.

A change from production of one grade of polymer to another typically requires a transition period for a polymerization reactor to switch over to new resin specifications and corresponding process conditions such as reaction temperature, reactants and reactant ratios. During a transition from production of one resin product to another, off-grade polymer material is produced that does not have the desired resin flow characteristic (e.g., melt index), density, or other property of either the initial product or the desired target product. In addition, a polymerization reaction operating under "steady state" conditions can encounter variations that can result in the production of off-grade polymer material that can lead to loss of revenue and reactor shutdown. Since production of off-grade polymer material presents an economic loss, it is desirable to minimize the length of time a reactor produces such material and the amount of material that is produced.

A number of methods have been described to reduce transient, off-grade polymer material. Such methods have involved feeding a polymerization retarder or catalyst poison (e.g., $CO_2$ or $O_2$) into the reactor, adjusting automatic flow ratio controllers to a new value, removing reactant gases from the reactor, reducing the catalyst level, adjusting the amount of the fluidized bed, and/or adding a nonreactive gas such as nitrogen, among other remedial actions.

Despite existing approaches to limit off-grade material, there is a continuing need and desire to provide a more effective and efficient process to reduce the amount of off-grade polymer material produced during the transition to a new product or as a result of a fluctuation during steady state manufacture.

U.S. Pat. No. 5,627,242, issued May 6, 1997, discloses methods for controlling a gas phase fluidized bed polymerization reaction to implement transitions from an initial reaction (in which the product is produced to meet a first set of specifications) to a target reaction (in which the product is produced to meet a second set of specifications). Some such embodiments implement such a transition by changing reaction parameters (e.g., temperature and reactant partial pressure) to predetermined intermediate values and later changing these parameters to their target values (for producing product that meets the second set of specifications) so as to reduce the amount of off-grade material produced during the transition. However, U.S. Pat. No. 5,627,242 does not teach or suggest setting reaction conditions (during performance of a pre-transition reaction in which a product is produced to meet a set of specifications and no off-grade material is produced) before implementing such a transition, to reduce (or minimize) the amount of off-grade material produced during the transition.

U.S. Pat. No. 6,846,884, issued Jan. 25, 2005, discloses methods for controlling resin properties during the production of polyolefins. In some embodiments, the methods implement rapid transitions from an initial reaction (in which the product is produced to meet a first set of specifications) to a target reaction (in which the product is produced to meet a second set of specifications). Some such embodiments employ coordinated manipulation of reaction temperature in combination with a secondary process variable to control resin flow properties to implement the transition (e.g., to move from production of one polymer grade to another) rapidly and in such a manner as to minimize the amount of off-grade material produced during the transition.

U.S. Pat. No. 6,846,884 describes a method for reducing the amount of off-grade polyolefin produced during a transition (during a continuous polymerization reaction) from production of a first polyolefin to production of a second polyolefin, where the second polyolefin is produced with a different reaction temperature than the first polyolefin. The target reaction temperature (for producing the second polyolefin) is compared to the initial reaction temperature, the reaction temperature is then changed (to a value above or below the target temperature as appropriate) and the inflow of the reactant gases modified. At the start of the transition, the reaction temperature is moved down to about 20 degrees C. below the target reaction temperature if the target temperature is lower, or moved up to about 20 degrees C. above the target temperature if higher, and concurrently, the inflow of one or more gases is modified to alter the gas composition in the reactor. The reaction temperature is then moved toward the target temperature as the averaged resin flow value approaches the target value. If desired, the altered reaction temperature and gas composition can be maintained at the initially altered level until the averaged resin flow value of the overall polyolefin in the reactor is within an acceptable range of the target resin flow value of the second polyolefin, whereupon the reaction temperature can be moved toward the target reaction temperature as the averaged resin flow value approaches the target resin flow value.

However, U.S. Pat. No. 6,846,884 does not teach or suggest setting reaction conditions (during performance of a pre-transition reaction in which a product is produced to meet a set of specifications and no off-grade material is produced) before implementing a transition to another reaction, to reduce (or minimize) the amount of off-grade material produced during the transition.

SUMMARY OF THE INVENTION

In a class of embodiments, the invention is a method for determining initial conditions for a transition from an initial reaction to a target reaction so as to reduce significantly (and preferably minimize or substantially minimize) the amount of off-grade product produced during the transition. In this context, "significant reduction" of the amount of off-grade product produced denotes significant reduction below the amount that would be produced with randomly determined (or an average of randomly determined) initial conditions for the transition. Some embodiments of the inventive method also determine preferred process control variables for implementing the transition. Some embodiments also include the steps of setting the reaction conditions to initial reaction conditions for at least substantially minimizing off-grade material production (before implementing the transition) and then implementing the transition (in a manner determined in accordance with the invention) to reach target reaction conditions at the end of the transition.

During the initial reaction, the product is to be produced with properties meeting an initial specification set. During the target reaction, the product is to be produced with properties meeting a target specification set. During the transition, the produced product can first cease to comply with the initial specification set due to noncompliance (with the initial specification set) of any of one, two, or more product properties. We sometimes use the expression that the product produced during the transition "goes off-grade" due to property A, or Property A "causes" production of off-grade product (property "A" being any product property specified by the initial specification set), to denote that the product ceases to comply with the initial specification set because property A ceases to comply with the initial specification set.

Some embodiments identify, as a "primary" property, one of the product's properties that can cause production of more off-grade product during the transition than can any of the other properties, in the sense that more product can be produced during the transition that fails to comply with both the initial specification set and target specification set due to noncompliance of the primary property (with the initial specification set and target specification set) than due to noncompliance of any other of the product properties with the initial specification set and target specification set.

In some embodiments, one of the product properties is identified as the primary property and the inventive method determines process control variables for implementing the transition such that the product produced during the transition goes off-grade due to the primary property at a first time and goes off-grade due to each of at least one non-primary product property at a time equal (or substantially equal) to the first time, the primary property first complies with the target specification set at a second time, and each non-primary property first complies with the target specification set at a time at least substantially equal to but not later than the second time. By implementing the transition in accordance with such process control variables, each non-primary property can be changed relatively slowly during the transition (e.g., the time constant for change of each non-primary property is maximized) subject to the other constraints (e.g., reduction or minimization of the amount of produced off-grade material) imposed by the invention.

In typical embodiments, resin is produced during the initial and target reactions. The amount of off-grade resin generated during a transition from production of an initial resin product (having properties determined by an initial specification set) to a final resin product (having properties determined by a target specification set) can be significantly reduced (and preferably minimized) in accordance with the invention by producing the resin with a selected set of initial resin product properties (within the range allowed by the initial specification set) at the start of the transition. In typical embodiments, the selected initial resin product properties (at the start of the transition) include resin density and a resin flow property (e.g., MI or FI). By optimal selection of the initial resin product properties at the start of the transition, off-grade volume can typically be reduced by as much as 35% below the amount that would be produced with randomly determined initial resin product properties (within the range allowed by the initial specification set) at the start of the transition. The selected initial resin product properties (at the start of the transition) can be predetermined based on the reactor constraints, process dynamics, and final (target) product properties. The reactor constraints, process dynamics, and target product properties can be modeled using analytical and numerical methods. The optimal initial resin product properties (at the start of the transition) determined in accordance with the invention (e.g., via numerical, graphical and/or analytical methods) are typically not intuitive, and instead are typically inconsistent with conventional thinking.

In some embodiments, the inventive method determines parameters for a transition from a first reaction for producing a product (having properties determined by an initial specification set) to a target reaction for producing a target product (having properties determined by a target specification set), including initial reaction parameters for commencing the transition and time constants for change of product parameters during the transition. The method includes the steps of:

(a) determining a primary property of the product (from the properties specified by the initial specification set and the target specification set);

(b) determining a starting value of the primary property (at the start of the transition) that minimizes or substantially minimizes the amount of off-grade product produced during the transition, causes the product produced during the transition to cease to comply with the initial specification set at a first time (at the start of or during the transition) due to noncompliance of the primary property with the initial specification set, and causes the primary property of the product produced during the transition to first comply with the target specification set at a second time (at the end of the transition); and (c) determining a starting value for each of at least one non-primary property of the product (each non-primary property being one of the properties, other than the primary property, specified by the initial specification set and the target specification set) at the start of the transition, and determining a time constant for change of each said non-primary property during the transition, such that the product produced during the transition ceases to comply with the initial specification set, due to noncompliance of each said non-primary property with the initial specification set, at a time during the transition that at least substantially coincides with the first time.

Preferably, step (c) also includes the step of determining the time constant for change of each said non-primary property such that each said non-primary property of the product produced during the transition first complies with the target specification set at a time that at least substantially coincides with the second time. In one example, starting conditions (and a time constant) for each of a secondary property and a tertiary property of the product (and optionally also for additional properties of the product) are determined such that the product produced during the transition ceases (at a time that at least substantially coincides with the first time) to comply with the initial specification set due to noncompliance of each of the primary property, the secondary property, and the tertiary property (and optionally also the additional properties) with the initial specification set, and each of the primary property, the secondary property, and the tertiary property (and optionally also the additional properties) of the product produced during the transition first complies with the target specification set at a time that at least substantially coincides with the second time. Each non-primary property preferably goes "off-grade" at (or substantially at) the same time as the primary property, and each non-primary property reaches a value in compliance with the target specification set as late as possible (but not later than the time the primary property reaches a value in compliance with the target specification set), so as to maximize the time constant for change of each non-primary property. It is typically preferable (e.g., to simplify control of the reaction) to change each non-primary product property relatively slowly during the transition without increasing the amount of produced off-grade product.

Optionally, the above-mentioned method including steps (a), (b), and (c), also includes the step of:

(d) implementing the transition by controlling process control variables such that the primary property has the starting value determined in step (b) at the start of the transition and such that the product produced during the transition ceases to comply with the initial specification set at said first time due to noncompliance of the primary property with the initial specification set, and ceases to comply with the initial specification set due to noncompliance of each said non-primary property with the initial specification set at a time during the transition that at least substantially coincides with the first time.

In some embodiments of the inventive method that include a step of identifying a primary property of a product produced in a reactor (from properties specified by an initial specification set and a target specification set), the step of identifying the primary property can include the steps of:

obtaining data (e.g., historical, simulated, or modeled data) indicative of instantaneous and average product properties (e.g., bed average properties where the product is produced in a fluidized bed reactor) for each of a number of different product properties before, during, and after the transition, where each of the different properties is compliant with the initial specification set at the start of the transition; and identifying, as the primary property, from the data one of the product properties that can cause production of more off-grade product during the transition than can any other one of the properties. This can be done as follows: it is determined that the transition can be implemented so as to produce a first amount of off-grade product that fails to comply with either the initial specification set or target specification set due to noncompliance of the primary property (with the initial specification set and target specification set), and it is also determined that the transition cannot be implemented so as to produce an amount, equal to or greater than the first amount, of off-grade product that fails to comply with either the initial specification set or target specification set due to noncompliance of any other of the product properties with the initial specification set and target specification set.

In other embodiments, the method includes the steps of:

(a) determining optimal starting values (at the start of a reaction transition) and initial change times (for beginning to change each product property) and time constants (for changing each product property during the transition) for a primary product property (e.g., one of MI and density), a secondary product property (e.g., the other one of MI and density), and optionally also one or more additional (e.g., tertiary) product properties; and (b) determining operational parameters (e.g., temperature, gas composition, comonomer composition, ethylene partial pressure, and/or catalyst composition) for setting instantaneous values of the product properties to the optimal starting values determined in step (a), and determining how to vary each of the operational parameters as a function of time to implement the transition in a manner consistent with the initial change times and time constants determined in step (a).

Typically, step (b) is performed by using a model of the reaction process that relates the product properties with instantaneous values of the operational parameters. Preferably the method also includes the step of:

(c) implementing the transition by controlling the operational parameters to set the instantaneous product properties to the optimal starting values determined in step (a), and change the instantaneous product properties in a manner consistent with each said initial change time and time constant determined in step (a).

BRIEF DESCRIPTION OF THE DRAWINGS

FIG. 2 is a simplified cross-sectional view of another fluidized bed reactor whose operation can be controlled in accordance with the invention.

FIG. 3 is a simplified cross-sectional view of another fluidized bed reactor whose operation can be controlled in accordance with the invention.

DETAILED DESCRIPTION OF PREFERRED EMBODIMENTS

Figure 1:
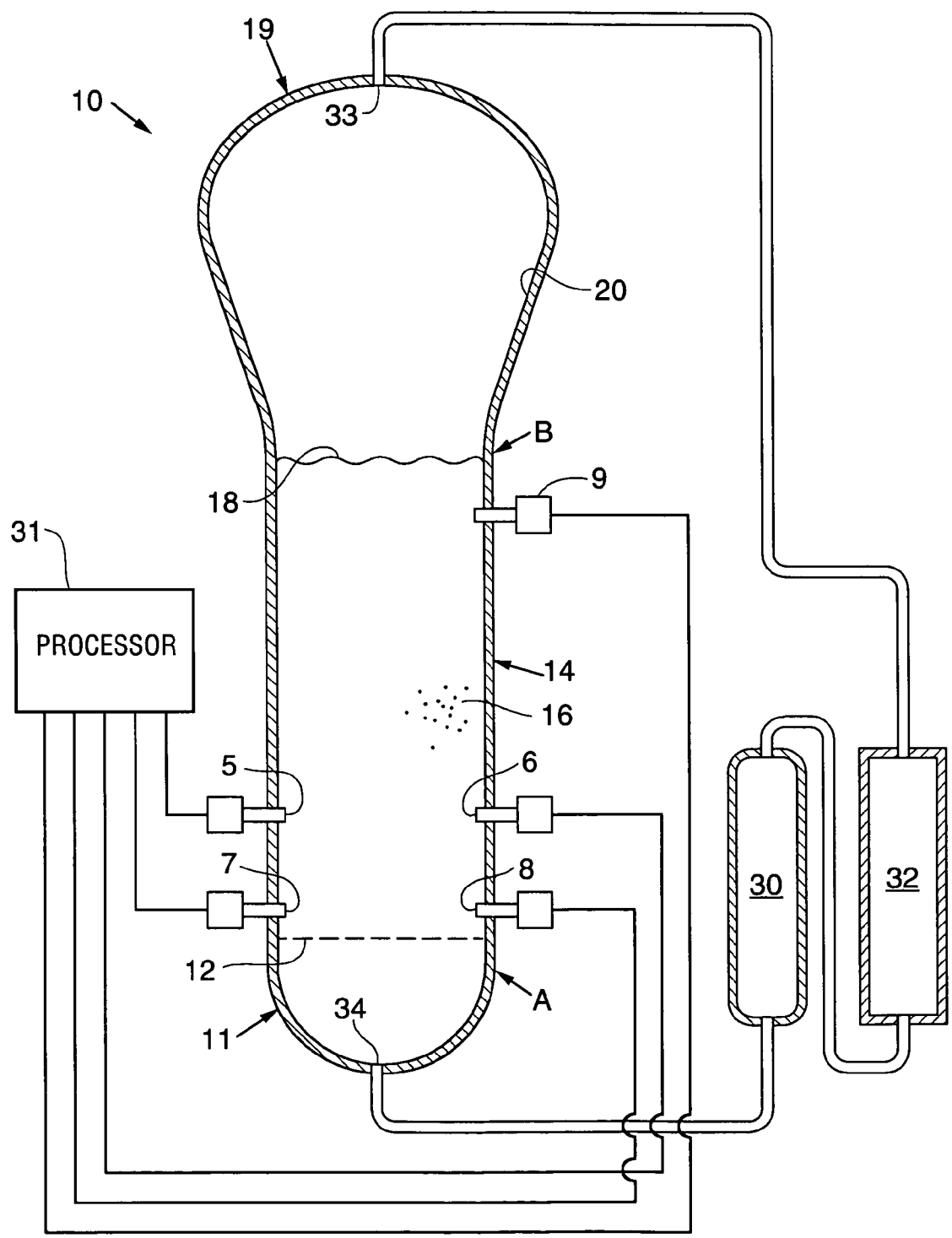
FIG. 1 is a simplified cross-sectional view of a system including, fluidized bed reactor (10), whose operation can be controlled in accordance with the invention.

A reactor system whose operation can be controlled in accordance with the invention will be described with reference to FIG. 1. The FIG. 1 system includes fluidized bed reactor 10. Reactor 10 has a bottom end 11, a top section 19, a cylindrical (straight) section 14 between bottom end 11 and top section 19, and a distributor plate 12 within section 14. The diameter of each horizontal cross-section of section 19 is greater than the diameter of straight section 14. In operation, dense-phase surface 18 is the boundary between lean phase material present within reactor 10 (above dense-phase surface 18) and dense-phase material 16 within reactor 10 (in the volume bounded by section 14, plate 12, and surface 18). In operation, freeboard surface 20 of reactor 10 includes the inner surface of top section 19 and the portion of the inner surface of section 14 above surface 18.

The FIG. 1 system also has a cooling control loop which includes circulating gas cooler 30 and compressor 32, coupled with reactor 10 as shown. During operation, the cooled circulating gas flows from cooler 30 through inlet 34 into reactor 10, then propagates upward through the bed and out from reactor 10 via outlet 33. The cooling fluid (whose temperature has increased during its flow through reactor 10) is pumped by compressor 32 from outlet 33 back to cooler 30. Temperature sensors (not shown) near the inlet and outlet of cooler 30 provide feedback to cooler 30 and/or compressor 32 to control the amount by which cooler 30 reduces the temperature of the fluid entering its inlet and/or flow rate through compressor 32.

Reactor 10 can be implemented as a mLLDPE (metallocene-catalyzed, linear low-density polyethylene) reactor, with straight section 14 having height 47 feet, six inches (from point A to point B) and distributor plate 12 positioned three feet, one inch above point A.

The FIG. 1 system also includes skin temperature sensors 5, 6, 7, and 8 (typically implemented as thermocouple sensors having fast response design), mounted in positions along straight section 14 of the reactor wall so as to protrude into the bed from the reactor wall by a small amount (e.g., one eighth of an inch) in fluid communication with a processor 31. Sensors 5-8 are configured and positioned to sense skin temperature (i.e., bed temperature very near to the wall of reactor 10) during reactor operation.

The FIG. 1 system also includes resistance temperature sensor 9 which is positioned and configured to sense bed temperature during reactor operation at a location within reactor 10 away from the reactor wall. Resistance temperature sensor 9 is mounted so as to protrude into the bed (e.g., 8 to 18 inches away from the reactor wall) more deeply than does sensor 5, 6, 7, or 8. Typically, resistance temperature sensor 9 would be positioned within a suitable thermowell that extends into the bed by a sufficient amount. Such a thermowell can protect sensor 9 from abrasive conditions to which it would otherwise be exposed during reactor operation and allow sensor 9 to be removed and replaced without requiring a reactor shutdown.

Other sensors can be employed to measure other characteristics of the FIG. 1 system during operation, and various sensors and other apparatus can be used to measure instantaneous and bed average product properties of the product produced by the FIG. 1 system.

It is well known how to control various process control variables (e.g., to control gas phase composition within reactor 10, concentration of a comonomer introduced into reactor 10, partial pressure of at least one reactant (e.g., ethylene) introduced into reactor, and the type and properties of each catalyst introduced into reactor 10, and to use elements 30 and 32 in the manner described above to control temperature) to control various reactions performed by the FIG. 1 system. In some embodiments of the invention, a transition during operation of a reactor (e.g., that of FIG. 1, 2, or 3) is implemented by controlling process control variables such that a primary property of the product has an optimal starting value at the start of the transition, the product produced during the transition ceases to comply with the initial specification set at a first time due to noncompliance of an instantaneous value of the primary property with the initial specification set, and the product produced during the reaction ceases to comply with the initial specification set due to noncompliance of an instantaneous value of each of a least one non-primary property with the initial specification set at a time during the transition that at least substantially coincides with the first time.

FIG. 2 is a simplified cross-sectional view of another fluidized bed reactor whose operation can be controlled in accordance with the invention. The FIG. 2 reactor has a cylindrical (straight) section between its bottom end and its top section, and a distributor plate 12 within the straight section. In operation, dense-phase surface 88 is the boundary between lean phase material 90 present within the reactor (above dense-phase surface 88) and dense-phase material 86 within the reactor (in the volume bounded by the straight section, plate 12, and surface 88).

FIG. 3 is a simplified cross-sectional view of another fluidized bed reactor whose operation can be controlled in accordance with the invention. The FIG. 3 reactor has a cylindrical (straight) section between its bottom end and its top section, and a distributor plate 12 within the straight section. The diameter of each horizontal cross-section of the top section is greater than the diameter of the straight section, but the top section of the FIG. 3 reactor is shaped differently than the top section of reactor 10 of FIG. 1. In operation of the FIG. 3 reactor, dense-phase surface 98 is the boundary between lean phase material 100 present within the reactor (above dense-phase surface 98) and dense-phase material 96 within the reactor (in the volume bounded by the straight section, plate 12, and surface 98).

We shall describe several embodiments of the invention with reference to FIGS. 4-9. Each of FIGS. 4-9 is a graph of data that simulates a transition (in production of a polyolefin in a fluidized bed reactor) from a first reaction in which the product has MI (melt index) and density determined by an initial specification set to a target reaction in which the product has MI and density determined by a target specification set. Specifically, the initial specification set requires MI in the range from 22 grams per 10 minutes to 26 grams per 10 minutes and density in the range from 0.922 grams/cc to 0.926 grams/cc, and the target specification set requires MI in the range from 0.80 grams per 10 minutes to 1.20 grams per 10 minutes and density in the range from 0.916 grams/cc to 0.920 grams/cc. The simulation assumes that no MI overshoot is allowable during the transition, that the maximum allowable density overshoot during the transition is to 0.915 grams/cc, and that the production rate is 7.0 Mlb/hour and the bed weight is 30 Mlb.

Figure 4:
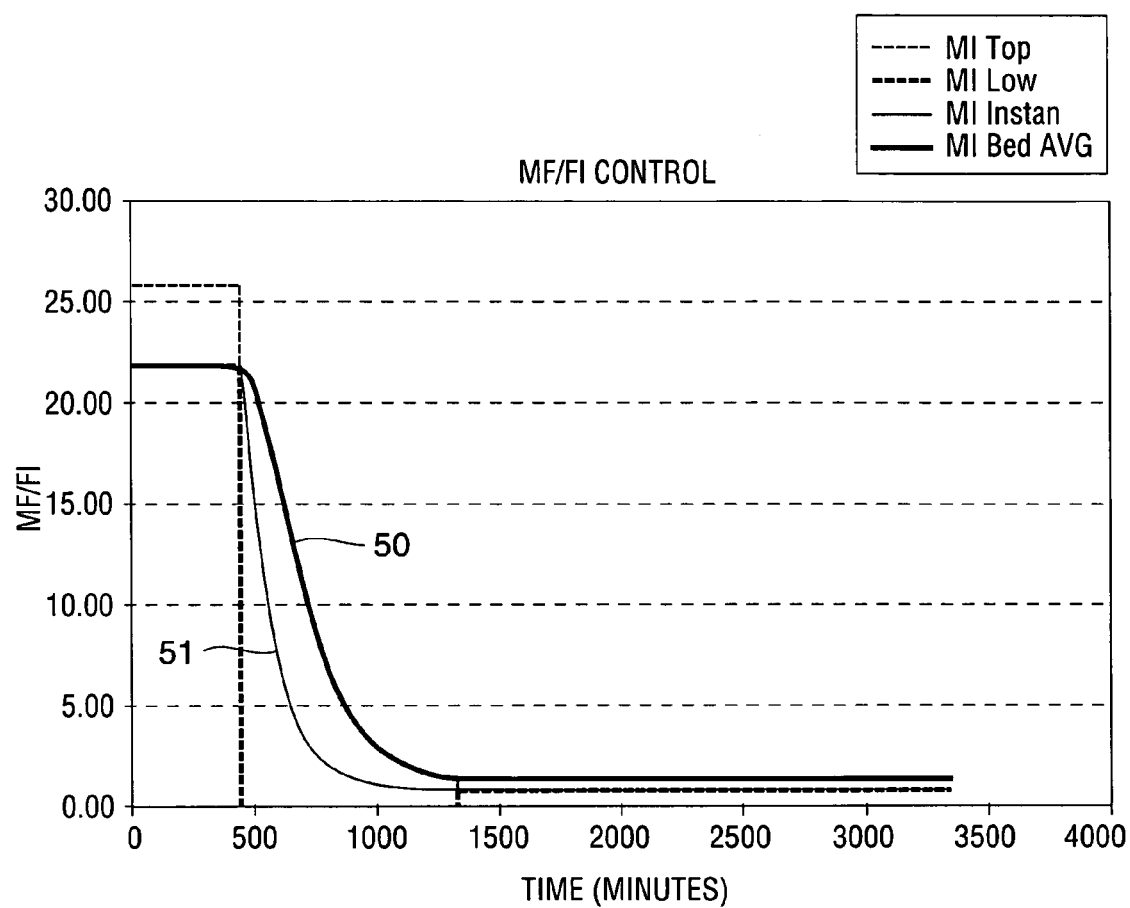
FIG. 4 is a graph of simulated instantaneous and bed average melt index (MI), in units of grams per 10 minutes, of polyolefin produced in a fluidized bed reactor.

Curve 50 of FIG. 4 indicates bed average MI (in units of grams per 10 minutes) and curve 51 of FIG. 4 indicates instantaneous MI (in units of grams per 10 minutes), both assuming that the initial bed average value of MI (at the start of the transition) is 22.00 grams per 10 minutes. Curves 50 and 51 indicate that the transition begins (and that MI first ceases to comply with the initial specification) at time t=450 minutes, and curve 50 indicates that the product's MI first complies with the target specification at t=1345 minutes. FIG. 4 assumes that the instantaneous value of MI is changed with a time constant of 0.5 hours during the transition.

Figure 5:
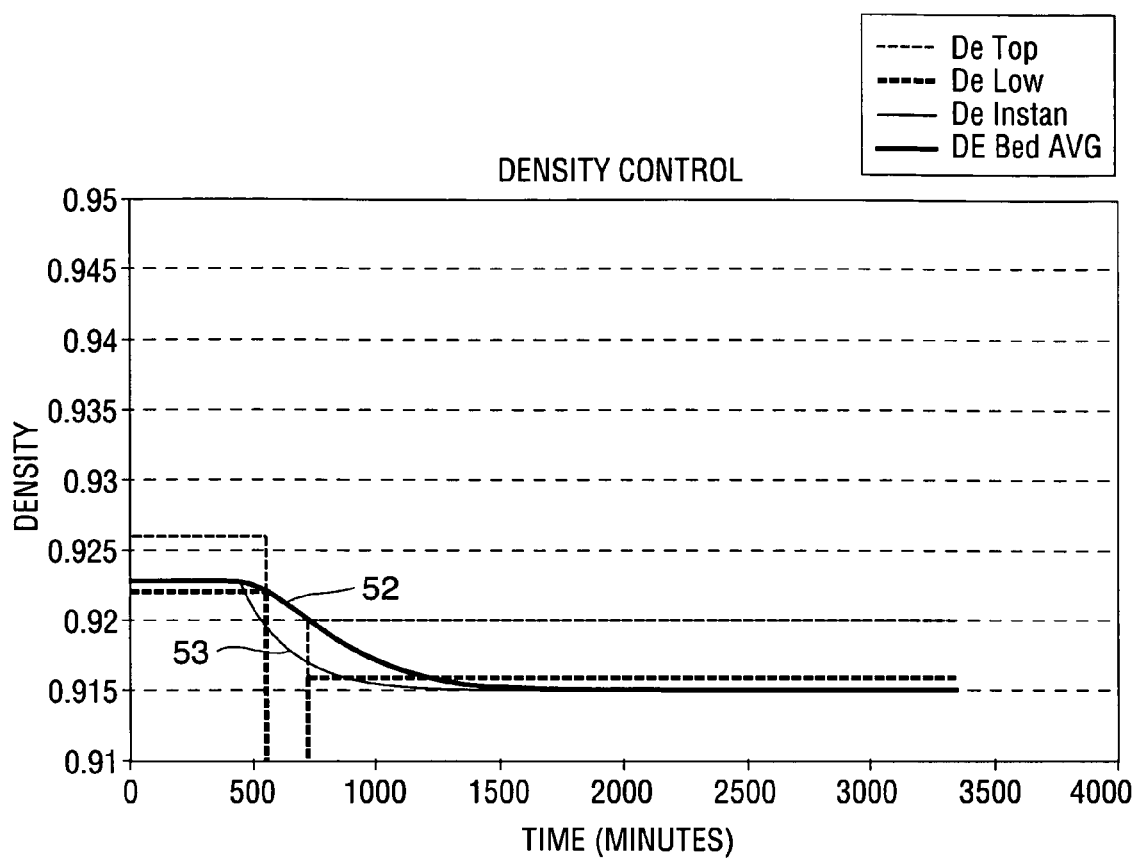
FIG. 5 is a graph of simulated instantaneous and bed average density (in units of grams/cc) polyolefin produced in a fluidized bed reactor.

Curve 52 of FIG. 5 indicates bed average density (in units of grams per cc) and curve 53 of FIG. 5 indicates instantaneous density (in units of grams per cc), both assuming that the initial bed average value of density (at the start of the transition) is 0.922 grams per cc. Curve 52 indicates that the product's density first ceases to comply with the initial specification at t=580 minutes and that the product's density first complies with the target specification at t=735 minutes. Curves 52 and 53 indicate that instantaneous and bed average values of density first begin to change at t=450 minutes. FIG. 5 assumes that instantaneous value of density is changed with a time constant of 0.75 hours during the transition.

Figure 6:
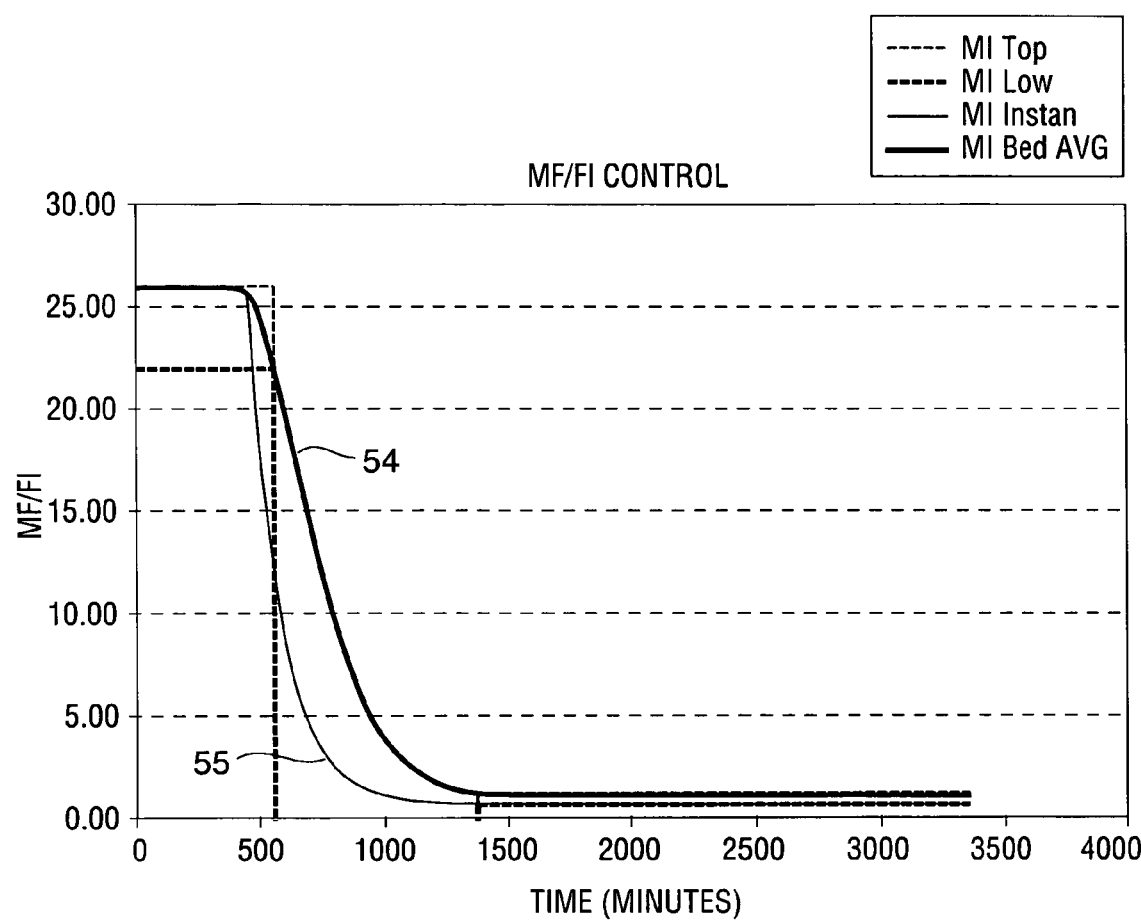
FIG. 6 is a graph of simulated instantaneous and bed average MI of polyolefin produced in a fluidized bed reactor, assuming a different initial value than in FIG. 4.

Curve 54 of FIG. 6 indicates bed average MI (in units of grams per 10 minutes) and curve 55 of FIG. 6 indicates instantaneous MI (in units of grams per 10 minutes), both assuming that the initial bed average value of MI (at the start of the transition) is 26.00 grams per 10 minutes. Curve 54 indicates that MI first ceases to comply with the initial specification at t=560 minutes and that MI first complies with the target specification at t=1370 minutes. Curves 54 and 55 indicate that instantaneous and bed average values of MI first begin to change at a time before t=560 minutes. FIG. 6 assumes that the instantaneous value of MI is changed with a time constant of 0.5 hours during the transition.

Figure 7:
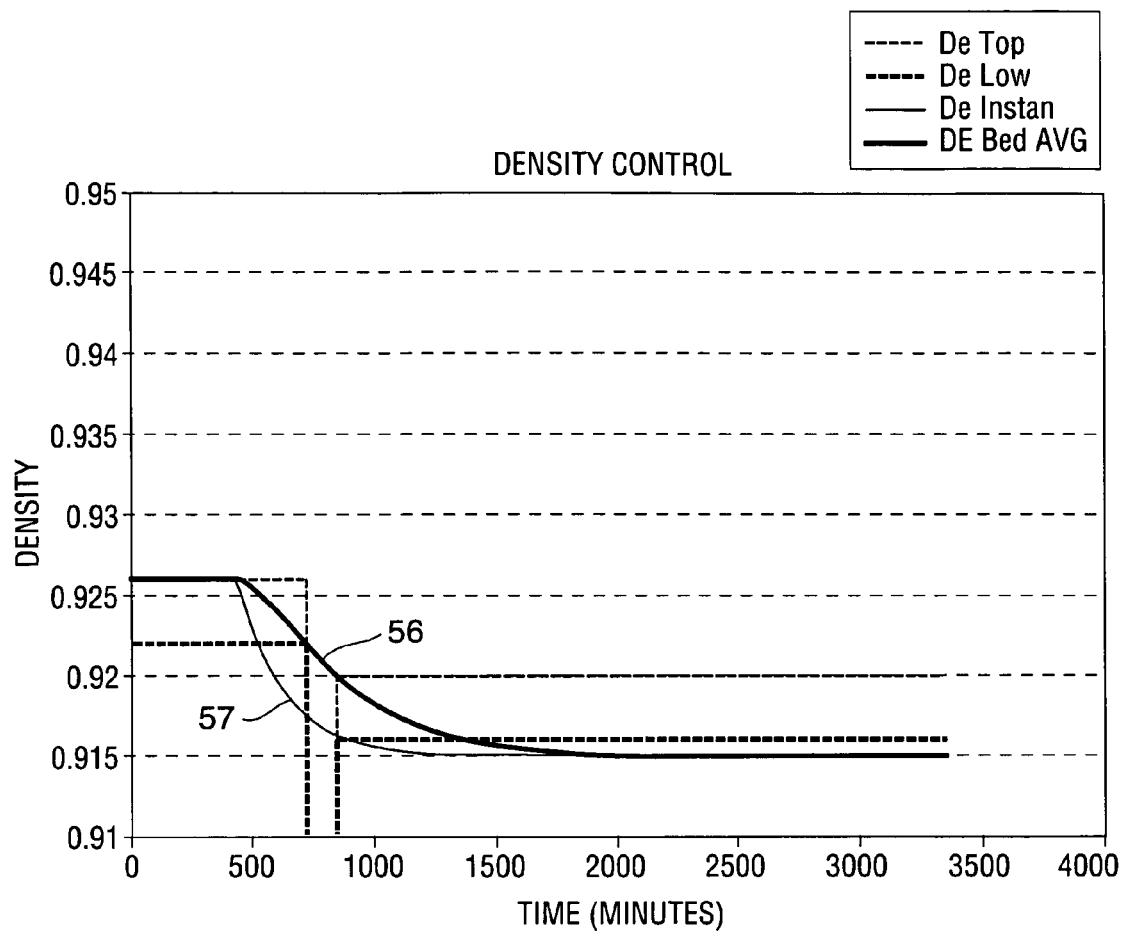
FIG. 7 is a graph of simulated instantaneous and bed average density of polyolefin produced in a fluidized bed reactor, assuming a different initial value than in FIG. 5.

Curve 56 of FIG. 7 indicates bed average density (in units of grams per cc) and curve 57 of FIG. 7 indicates instantaneous density (in units of grams per cc), both assuming that the initial bed average value of density (at the start of the transition) is 0.926 grams per cc. Curve 56 indicates that density first ceases to comply with the initial specification at t=730 minutes, and that the product's density first complies with the target specification at t=855 minutes. FIG. 7 assumes that instantaneous value of density is changed with a time constant of 0.75 hours during the transition.

Figure 8:
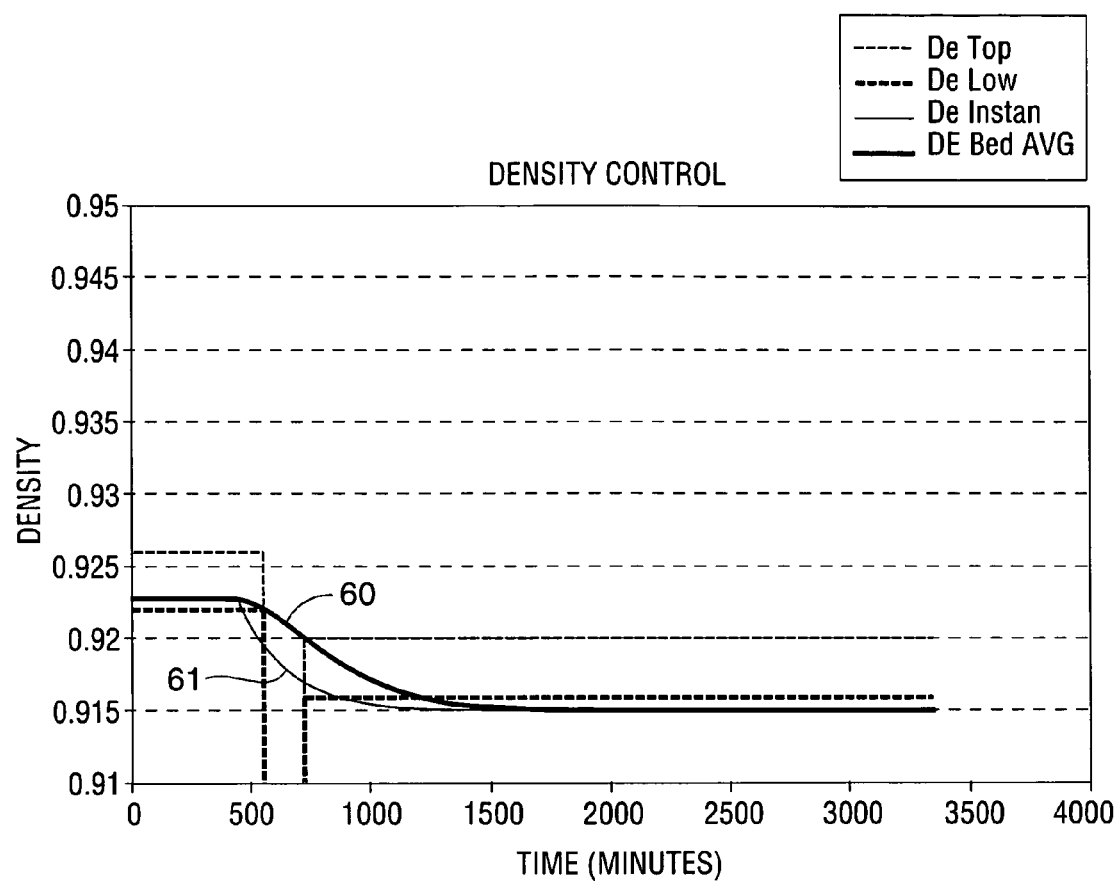
FIG. 8 is a graph of simulated instantaneous and bed average density of polyolefin produced in a fluidized bed reactor, assuming a different initial value than in FIG. 7.

Curve 60 of FIG. 8 indicates bed average density (in units of grams per cc) and curve 61 of FIG. 8 indicates instantaneous density (in units of grams per cc), both assuming that the initial bed average value of density (at the start of the transition) is 0.9228 grams per cc. Curve 60 indicates that density first ceases to comply with the initial specification at t=560 minutes, and that the product's density first complies with the target specification at t=725 minutes. FIG. 8 assumes that instantaneous value of density is changed with a time constant of 0.75 hours during the transition.

Figure 9:
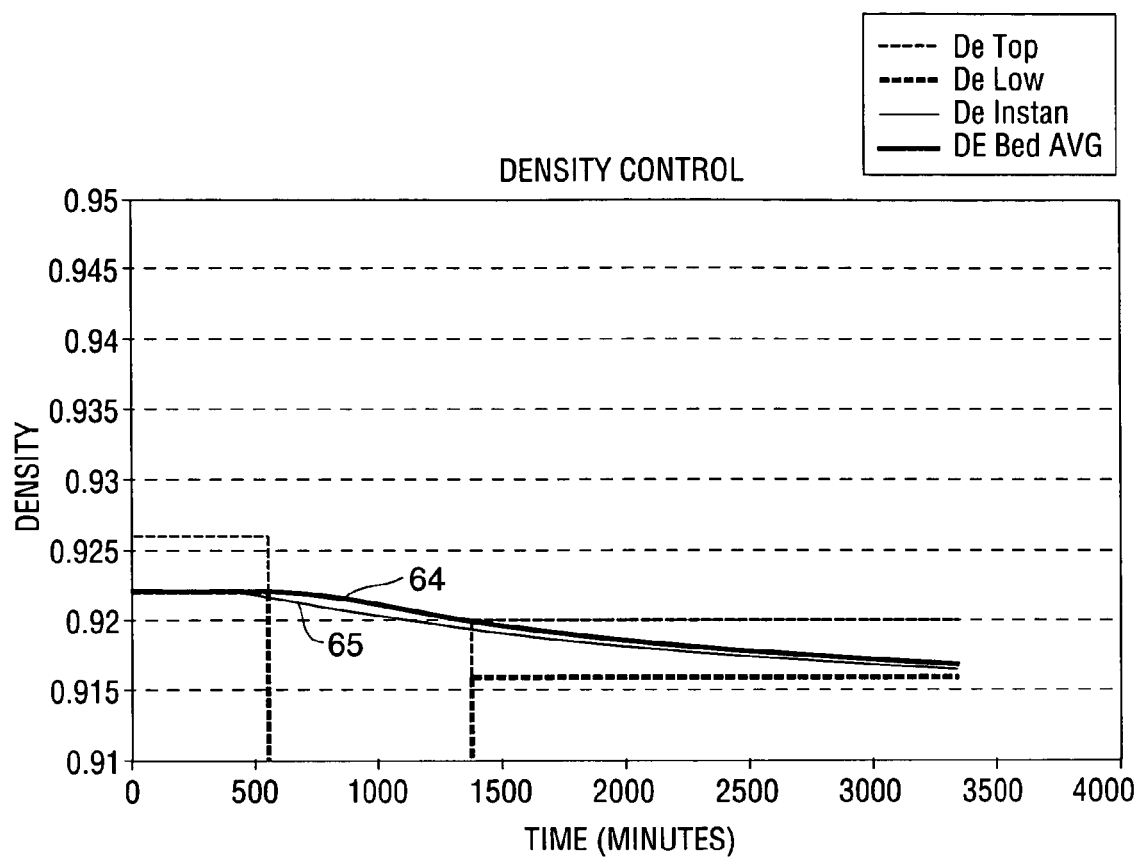
FIG. 9 is a graph of simulated instantaneous and bed average density of polyolefin produced in a fluidized bed reactor, assuming a different initial value and time constant for change than in FIG. 7 or FIG. 8.

Curve 64 of FIG. 9 indicates bed average density (in units of grams per cc) and curve 65 of FIG. 9 indicates instantaneous density (in units of grams per cc), both assuming that the initial bed average value of density (at the start of the transition) is 0.9221 grams per cc. Curve 64 indicates that density first ceases to comply with the initial specification at t=560 minutes, and that the product's density first complies with the target specification at t=1370 minutes. FIG. 9 assumes that instantaneous value of density is changed with a time constant of 7.40 hours during the transition.

In a class of embodiments, the invention is a method for determining initial conditions for a transition (from an initial reaction to a target reaction) so as to reduce (or minimize or substantially minimize) the amount of off-grade material produced during the transition. Some embodiments of the inventive method also determine preferred process control variables for implementing the transition. Some embodiments also include the steps of setting the reaction conditions to the preferred initial reaction conditions (before implementing the transition) and then implementing the transition (in a manner determined in accordance with the invention) to reach target reaction conditions at the end of the transition.

In typical embodiments of the invention, one of the product properties (specified by both the initial specification set and target specification set) that can cause production of more off-grade product during the transition than can any other one of the properties is identified as the "primary" property. For example, to implement the transition whose initial and target specifications are set forth in FIGS. 4-9 in accordance with an embodiment of the invention, the primary property can be identified by determining that more product produced during the transition (as implemented in a variety of different ways) can fail to comply with both the initial specification set and target specification set due to noncompliance of one property (i.e., the primary property) with the initial specification set and target specification set than due to noncompliance of any other of the product properties with the initial specification set and target specification set.

Consider the following specific example in which MI is identified as the primary property for the transition whose initial and target specifications are set forth in FIGS. 4-9. The simulations underlying FIGS. 4-9 indicate the following:

the simulation assuming that MI is changed as in FIG. 4 and density is changed as in FIG. 5 indicates that 104.4 Mlbs is the total amount of off-grade product produced during the transition, 104.4 Mlbs is the amount of MI off-grade product (the amount of off-grade product produced during the transition that fails to comply with both the initial specification and target specification set due to failure of its MI to comply with either specification set), and that 18.1 Mlbs is the amount of density off-grade product (the amount of off-grade product produced during the transition that fails to comply with both the initial specification and target specification set due to failure of its density to comply with either specification set);

the simulation assuming that MI is changed as in FIG. 6 and density is changed as in FIG. 7 indicates that 94.5 Mlbs is the total amount of off-grade product produced during the transition, 94.5 Mlbs is the amount of MI off-grade product, and that 14.6 Mlbs is the amount of density off-grade product;

the simulation assuming that MI is changed as in FIG. 6 and density is changed as in FIG. 8 indicates that 94.5 Mlbs is the total amount of off-grade product produced during the transition, 94.5 Mlbs is the amount of MI off-grade product, and that 19.3 Mlbs is the amount of density off-grade product; and the simulation assuming that MI is changed as in FIG. 6 and density is changed as in FIG. 9 indicates that 94.5 Mlbs is the total amount of off-grade product produced during the transition, 94.5 Mlbs is the amount of MI off-grade product, and that 94.5 Mlbs is the amount of density off-grade product.

Thus, the simulations that underlie FIGS. 4-9 indicate that more product produced during the transition (as implemented in a variety of different ways) fails to comply with both the initial specification set and target specification set due to noncompliance of MI with both specification sets than due to noncompliance of density with both specification sets. This suggests that MI and not density is the primary product property. In accordance with the invention, identification of MI as primary product property can (and would typically) be confirmed by additional simulations that assume other initial conditions at the start of the transition and other time constant values for change of MI and density during the transition.

Some embodiments of the invention (in which one product property is identified as the primary property) identify preferred process control variables for implementing the transition to cause the product produced during the transition to go "off-grade" due to the primary property and due t at the same time (or substantially the same time). Preferably also, the preferred process control variables cause each non-primary property to reach a value that complies with the target specification set as late as possible during the transition (but not later than the time the primary property reaches a value compliant with the target specification set). By implementing the transition using such process control variables, each non-primary property is changed relatively slowly during the transition (i.e., the time constant for change of each non-primary property is maximized) subject to the other constraints imposed in accordance with the invention.

For example, consider an embodiment in which MI is identified as the primary property for the transition whose initial and target specification sets are set forth in FIGS. 4-9 (as indicated in FIGS. 4-9, the initial specification set requires that 22.00 grams per 10 minutes≦MI≦26.00 grams per 10 minutes and that 0.922 grams per cc≦density≦0.926 grams per cc, and the target specification set requires that 0.80 grams per 10 minutes≦MI≦1.20 grams per 10 minutes and that 0.916 grams per cc≦density≦0.920 grams per cc). The initial conditions indicated by curve 54 of FIG. 6 and curve 56 of FIG. 7 for the transition (i.e., initial bed average MI=26.00 grams per 10 minutes, and initial bed average density=0.926 grams per cc) minimize the amount of off-grade material produced during the transition. However, although implementation of the transition consistent with FIGS. 6 and 7 (including by choosing the initial conditions indicated by curves 54 and 56) minimizes off-grade material production in accordance with the invention (by producing only 94.5 Mlbs of off-grade product), it requires that both MI and density be changed rapidly (i.e., with time constants of 0.5 and 0.75 hours, respectively) during the transition.

Implementing the transition consistent with FIGS. 6 and 8 (including by choosing the initial conditions indicated by curves 54 and 60) or FIGS. 6 and 9 (including by choosing the initial conditions indicated by curves 54 and 64) also minimizes off-grade material production in accordance with the invention (by producing only 94.5 Mlbs of off-grade product). Implementation of the transition consistent with FIGS. 6 and 9 (rather than FIGS. 6 and 8, or FIGS. 6 and 7) is preferred because it not only minimizes off-grade material production in accordance with the invention but also eliminates the requirement for changing density rapidly (i.e., it specifies a much slower change of density, with a time constant of 7.40 hours) during the transition. In contrast, implementation of the transition consistent with any of FIGS. 6 and 9, FIGS. 6 and 8, or FIGS. 6 and 7, requires change of MI with a time constant of 0.5 hours during the transition.

A preferred method for identifying preferred initial conditions and process control variables consistent with FIGS. 6 and 9, having already identified initial conditions and process control variables (i.e., those of FIGS. 6 and 7) that minimize off-grade material production, includes the following steps:

determining initial conditions and process control variables that cause the product produced during the transition to go off-grade due to each considered non-primary product property (i.e., density) at the same (or substantially the same) time as the produced product goes off-grade due to the primary property. Thus, initial conditions and process control variables consistent with FIGS. 6 and 8 are determined. In FIG. 6, product produced during the transition goes "off-grade" due to the primary property (MI) at t=560 minutes. Having determined this time (t=560 minutes), the initial values and process control variables that result in FIG. 8 are determined to cause the product produced in the transition to go off-grade due to density at the same time (t=560 minutes) without increasing the overall amount of off-grade product produced during the transition; and then, determining preferred initial conditions and process control variables (i.e., those consistent with FIGS. 6 and 9) that cause each considered non-primary property (i.e., density) to reach a value that complies with the target specification set as late as possible (but not later than the time the primary property reaches a value that complies with the target specification set) and cause the product produced during the transition to go off-grade due to each considered non-primary product property (i.e., density) at the same (or substantially the same) time as the produced product goes off-grade due to the primary property, and without increasing the overall amount of off-grade product produced during the transition. In FIG. 8 the density of product produced during the transition first complies with the target specification set at t=725 minutes, and in FIG. 6 the MI of the product produced during the transition first complies with the target specification set at t=1370 minutes. Having determined these times, the initial values and process control variables (including time constant for changing density) that result in FIG. 9 are determined so that the density of product produced during the transition first complies with the target specification set at t=1370 minutes (without increasing the overall amount of off-grade product produced during the transition).

Figure 10:
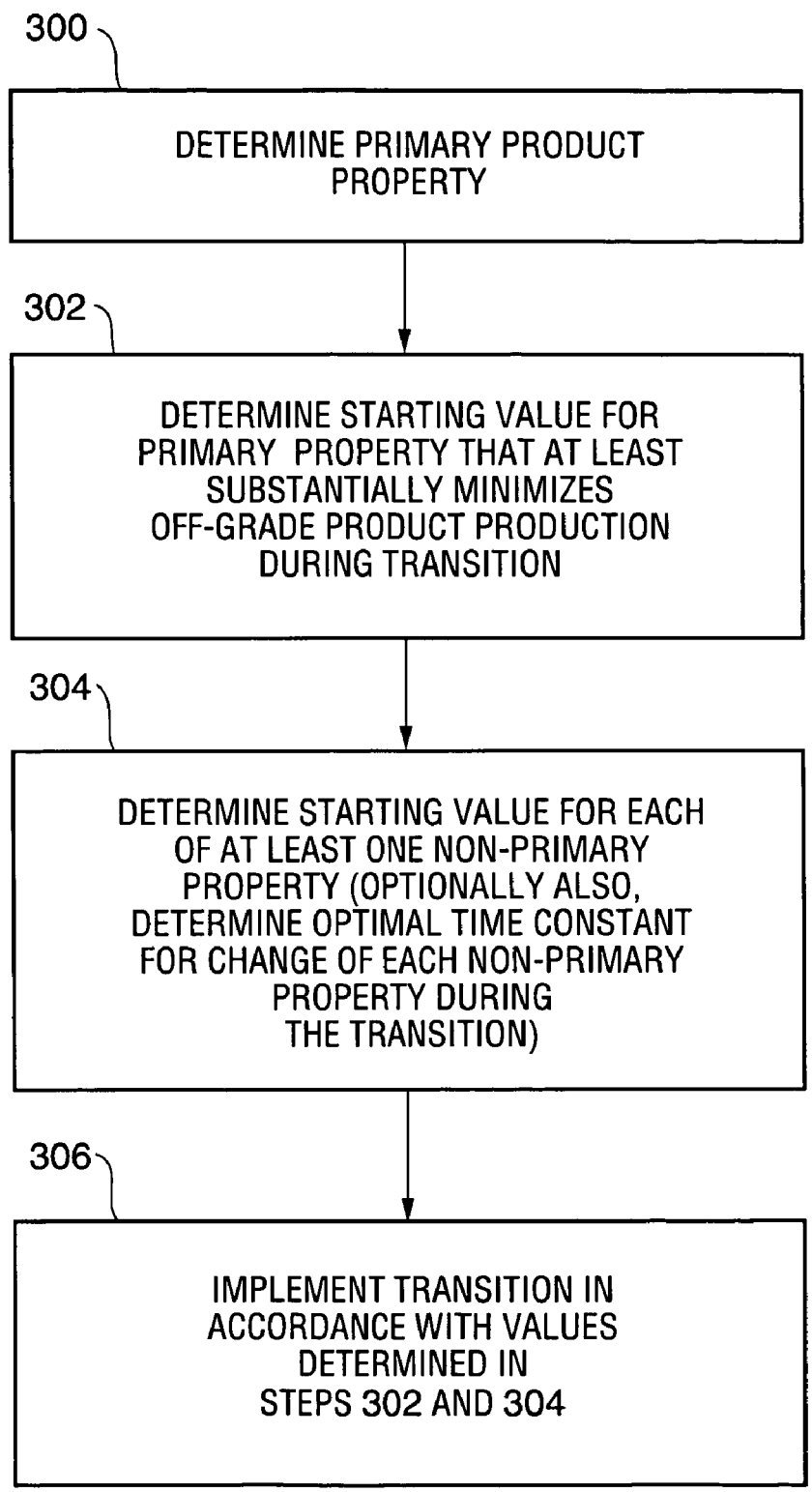
FIG. 10 is a flow chart of an embodiment of the inventive method.

More generally, some embodiments of the inventive method determine parameters for a transition from a first reaction for producing a product (having properties determined by an initial specification set) to a target reaction for producing a target product (having properties determined by a target specification set), including initial reaction parameters for commencing the transition and time constants for change of product parameters during the transition. As shown in FIG. 10, the method can include the steps of:

(a) determining a primary property of the product from the properties specified by the initial specification set and the target specification set (step 300 of FIG. 10);

(b) determining a starting value of the primary property (at the start of the transition) that minimizes or substantially minimizes the amount of off-grade product produced during the transition, causes the product produced during the transition to cease to comply with the initial specification set at a first time (at the start of or during the transition) due to noncompliance of the primary property with the initial specification set, and causes the primary property of the product produced during the transition to first comply with the target specification set at a second time at the end of the transition (step 302 of FIG. 10); and (c) determining a starting value for each of at least one non-primary property of the product (each non-primary property being one of the properties, other than the primary property, specified by the initial specification set and the target specification set) at the start of the transition, and determining a time constant for change of each said non-primary property during the transition, such that the product produced during the transition ceases to comply with the initial specification set, due to noncompliance of each said non-primary property with the initial specification set, at a time during the transition that at least substantially coincides with the first time (step 304 of FIG. 10).

Preferably, step (c) also includes the step of determining the time constant for change of each said non-primary property such that each said non-primary property of the product produced during the transition first complies with the target specification set at a time that at least substantially coincides with the second time. In one example, starting conditions (and a time constant) for each of a secondary property and a tertiary property of the product (and optionally also for additional properties of the product) are determined such that the product produced during the transition ceases (at a time that at least substantially coincides with the first time) to comply with the initial specification set due to noncompliance of each of the primary property, the secondary property, and the tertiary property (and optionally also the additional properties) with the initial specification set, and each of the primary property, the secondary property, and the tertiary property (and optionally also the additional properties) of the product produced during the transition first complies with the target specification set at a time that at least substantially coincides with the second time. Each non-primary property preferably goes "off-grade" at (or substantially at) the same time as the primary property, and each non-primary property reaches a value in compliance with the target specification set as late as possible (but not later than the time the primary property reaches a value in compliance with the target specification set), so as to maximize the time constant for change of each non-primary property. It is typically preferable (e.g., to simplify control of the reaction) to change each non-primary product property relatively slowly during the transition without increasing the amount of produced off-grade product.

Optionally, methods including steps 300, 302, and 304 of FIG. 10, also include the step of:

(d) implementing the transition by controlling process control variables such that the primary property and each said non-primary property have the starting values determined in steps (b) and (c) at the start of the transition, and the product produced during the transition ceases to comply with the initial specification set at said first time due to noncompliance of the primary property with the initial specification set and ceases to comply with the initial specification set due to noncompliance of each said non-primary property with the initial specification set at a time during the transition that at least substantially coincides with the first time (step 306 of FIG. 10). A model of the reaction process can be employed to determine the process control variables (e.g., temperature, gas composition, comonomer composition, reactor pressure, and/or catalyst composition) controlled in step (d) so that all "instantaneous" product properties have the starting values determined in steps (b) and (c), and so that each of the process control variables (also referred to herein as operational parameters) is varied as a function of time to implement the transition in a manner consistent with steps (b) and (c).

In some embodiments of the inventive method that include a step of identifying a primary property of a product produced in a reactor (from properties specified by an initial specification set and a target specification set), the step of identifying the primary property can include the steps of:

obtaining data (e.g., historical, simulated, or modeled data) indicative of instantaneous and average product properties (e.g., bed average properties where the product is produced in a fluidized bed reactor) for each of N different product properties (where N is any positive integer) before, during, and after the transition, for a number of different initial product properties (compliant with the initial specification set) at the start of the transition; and identifying as the primary property one of the product properties that can cause production of more off-grade product during the transition than can any other one of the properties. This can be done as follows: it is determined that the transition can be implemented so as to produce a first amount of off-grade product that fails to comply with either the initial specification set or target specification set due to noncompliance of the primary property (with the initial specification set and target specification set), and it is also determined that the transition cannot be implemented so as to produce an amount, equal to or greater than the first amount, of off-grade product that fails to comply with either the initial specification set or target specification set due to noncompliance of any other of the product properties with the initial specification set and target specification set.

In other embodiments, the method includes the steps of:

(a) determining optimal starting values (at the start of a reaction transition) and initial change times (for beginning to change each product property) and time constants (for changing each product property during the transition) for a primary product property (e.g., one of MI and density), a secondary product property (e.g., the other one of MI and density), and optionally also one or more additional (e.g., tertiary) product properties; and (b) determining operational parameters (e.g., temperature, gas composition, comonomer composition, reactor pressure, and/or catalyst composition) for setting instantaneous values of the product properties to the optimal starting values determined in step (a), and determining how to vary each of the operational parameters as a function of time to implement the transition in a manner consistent with the initial change times and time constants determined in step (a).

Typically, step (b) is performed by using a model of the reaction process that relates the product properties with instantaneous values of the operational parameters. Preferably the method also includes the step of:

(c) implementing the transition by controlling the operational parameters to set the instantaneous product properties to the optimal starting values determined in step (a), and change the instantaneous product properties in a manner consistent with each said initial change time and time constant determined in step (a).

In typical embodiments of the invention, the product produced during the initial and target reactions is resin. The amount of off-grade resin generated during a transition from production of an initial resin product (having properties determined by an initial specification set) to a final resin product (having properties determined by a target specification set) can be significantly reduced (and preferably minimized) in accordance with the invention by producing the resin with a selected set of initial resin product properties (within the range allowed by the initial specification set) at the start of the transition. In typical embodiments, the selected initial resin product properties (at the start of the transition) include resin density and a resin flow property (e.g., MI or FI). By optimal selection of the initial resin product properties at the start of the transition, off-grade volume can typically be reduced by as much as 35% below the amount that would be produced with randomly determined initial resin product properties (within the range allowed by the initial specification set) at the start of the transition. The selected initial resin product properties (at the start of the transition) can be predetermined based on the reactor constraints, process dynamics, and target product properties. The reactor constraints, process dynamics, and target product properties can be modeled using analytical and numerical methods. The optimal initial resin product properties (at the start of the transition) determined in accordance with the invention (e.g., via numerical, graphical and/or analytical methods) are typically not intuitive, and instead are typically inconsistent with conventional thinking.

We next describe examples of commercial-scale reactions (e.g., commercial-scale, gas-phase fluidized-bed polymerization reactions) that can be controlled in accordance with the invention. Some such reactions can occur in a reactor having the geometry of reactor 10 of FIG. 1, or the geometry of the FIG. 2 or FIG. 3 reactor. In different embodiments of the invention, performance of any of a variety of different reactors is controlled in accordance with the invention.

In some embodiments, a continuous gas phase fluidized bed reactor is controlled in accordance with the invention while it operates to perform polymerization as follows. The fluidized bed is made up of polymer granules. Gaseous feed streams of the primary monomer and hydrogen together with liquid or gaseous comonomer are mixed together in a mixing tee arrangement and introduced below the reactor bed into the recycle gas line. For example, the primary monomer is ethylene and the comonomer is hexene. The individual flow rates of ethylene, hydrogen and comonomer are controlled to maintain fixed composition targets. The ethylene concentration is controlled to maintain a constant ethylene partial pressure. The hydrogen is controlled to maintain a constant hydrogen to ethylene mole ratio. The hexene is controlled to maintain a constant hexene to ethylene mole ratio. The concentration of all gases is measured by an on-line gas chromatograph to ensure relatively constant composition in the recycle gas stream. A solid or liquid catalyst is injected directly into the fluidized bed using purified nitrogen as a carrier. Its rate is adjusted to maintain a constant production rate. The reacting bed of growing polymer particles is maintained in a fluidized state by the continuous flow of the make up feed and recycle gas through the reaction zone. In some implementations, a superficial gas velocity of 1-3 ft/sec is used to achieve this, and the reactor is operated at a total pressure of 300 psig. To maintain a constant reactor temperature, the temperature of the recycle gas is continuously adjusted up or down to accommodate any changes in the rate of heat generation due to the polymerization. The fluidized bed is maintained at a constant height by withdrawing a portion of the bed at a rate equal to the rate of formation of particulate product. The product is removed semi-continuously via a series of valves into a fixed volume chamber, which is simultaneously vented back to the reactor. This allows for highly efficient removal of the product, while at the same time recycling a large portion of the unreacted gases back to the reactor. This product is purged to remove entrained hydrocarbons and treated with a small steam of humidified nitrogen to deactivate any trace quantities of residual catalyst.

In other embodiments, a reactor is controlled in accordance with the invention while it operates to perform polymerization using any of a variety of different processes (e.g., solution, slurry, or gas phase processes). For example, the reactor can be a fluidized bed reactor operating to produce polyolefin polymers by a gas phase polymerization process. This type of reactor and means for operating such a reactor are well known. In operation of such reactors to perform gas phase polymerization processes, the polymerization medium can be mechanically agitated or fluidized by the continuous flow of the gaseous monomer and diluent.

In some embodiments, a polymerization reaction is controlled in accordance with the invention. The reaction can be a continuous gas phase process (e.g., a fluid bed process). A fluidized bed reactor for performing such a process typically comprises a reaction zone and a so-called velocity reduction zone. The reaction zone comprises a bed of growing polymer particles, formed polymer particles and a minor amount of catalyst particles fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. This method of operation is referred to as "condensed mode". A suitable rate of gas flow may be readily determined by simple experiment. Make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The gas is passed through a heat exchanger wherein the heat of polymerization is removed, compressed in a compressor and then returned to the reaction zone.

The reactor temperature of the fluid bed process can range from 30° C. or 40° C. or 50° C. to 90° C. or 100° C. or 110° C. or 120° C. or 150° C. In general, the reactor temperature is operated at the highest temperature that is feasible taking into account the sintering temperature of the polymer product within the reactor. The polymerization temperature, or reaction temperature typically must be below the melting or "sintering" temperature of the polymer to be formed. Thus, the upper temperature limit in one embodiment is the melting temperature of the polyolefin produced in the reactor.

In other embodiments, a reactor whose operation is controlled in accordance with the invention effects polymerization by a slurry polymerization process. A slurry polymerization process generally uses pressures in the range of from 1 to 50 atmospheres and even greater and temperatures in the range of 0° C. to 120° C., and more particularly from 30° C. to 100° C. In a slurry polymerization, a suspension of solid, particulate polymer is formed in a liquid polymerization diluent medium to which monomer and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, a branched alkane in one embodiment. The medium employed should be liquid under the conditions of polymerization and relatively inert. When a propane medium is used the process must be operated above the reaction diluent critical temperature and pressure. In one embodiment, a hexane, isopentane or isobutane medium is employed.

In other embodiments, a reaction controlled in accordance with the invention is or includes particle form polymerization, or a slurry process in which the temperature is kept below the temperature at which the polymer goes into solution. In other embodiments, a reaction controlled in accordance with the invention is a loop reactor or one of a plurality of stirred reactors in series, parallel, or combinations thereof. Non-limiting examples of slurry processes include continuous loop or stirred tank processes.

A reaction controlled in accordance with some embodiments of the invention can produce homopolymers of olefins, e.g., ethylene, and/or copolymers, terpolymers, and the like, of olefins, particularly ethylene, and at least one other olefin. The olefins, for example, may contain from 2 to 16 carbon atoms in one embodiment; and in another embodiment, ethylene and a comonomer comprising from 3 to 12 carbon atoms in another embodiment; and ethylene and a comonomer comprising from 4 to 10 carbon atoms in yet another embodiment; and ethylene and a comonomer comprising from 4 to 8 carbon atoms in yet another embodiment. A reaction controlled in accordance with the invention can produce polyethylenes. Such polyethylenes can be homopolymers of ethylene and interpolymers of ethylene and at least one α-olefin wherein the ethylene content is at least about 50% by weight of the total monomers involved. Exemplary olefins that may be utilized in embodiments of the invention are ethylene, propylene, 1-butene, 1-pentene, 1-hexene, 1-heptene, 1-octene, 4-methylpent-1-ene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene, and olefins formed in situ in to polymerization medium. When olefins are formed in situ in the polymerization medium, the formation of polyolefins containing long chain branching may occur.

In the production of polyethylene or polypropylene, comonomers may be present in the polymerization reactor. When present, the comonomer may be present at any level with the ethylene or propylene monomer that will achieve the desired weight percent incorporation of the comonomer into the finished resin. In one embodiment of polyethylene production, the comonomer is present with ethylene in a mole ratio range of from 0.0001 (comonomer:ethylene) to 50, and from 0.0001 to 5 in another embodiment, and from 0.0005 to 1.0 in yet another embodiment, and from 0.001 to 0.5 in yet another embodiment. Expressed in absolute terms, in making polyethylene, the amount of ethylene present in the polymerization reactor may range to up to 1000 atmospheres pressure in one embodiment, and up to 500 atmospheres pressure in another embodiment, and up to 200 atmospheres pressure in yet another embodiment, and up to 100 atmospheres in yet another embodiment, and up to 50 atmospheres in yet another embodiment.

Hydrogen gas is often used in olefin polymerization to control the final properties of the polyolefin. For some types of catalyst systems, it is known that increasing concentrations (partial pressures) of hydrogen increase the melt flow (MF) and/or melt index (MI) of the polyolefin generated. The MF or MI can thus be influenced by the hydrogen concentration. The amount of hydrogen in the polymerization can be expressed as a mole ratio relative to the total polymerizable monomer, for example, ethylene, or a blend of ethylene and hexane or propene. The amount of hydrogen used in some polymerization processes is an amount necessary to achieve the desired MF or MI of the final polyolefin resin. In one embodiment, the mole ratio of hydrogen to total monomer ($H_2$:monomer) is greater than 0.00001. The mole ratio is greater than 0.0005 in another embodiment, greater than 0.001 in yet another embodiment, less than 10 in yet another embodiment, less than 5 in yet another embodiment, less than 3 in yet another embodiment, and less than 0.10 in yet another embodiment, wherein a desirable range may comprise any combination of any upper mole ratio limit with any lower mole ratio limit described herein. Expressed another way, the amount of hydrogen in the reactor at any time may range to up to 10 ppm in one embodiment, or up to 100 or 3000 or 4000 or 5000 ppm in other embodiments, or between 10 ppm and 5000 ppm in yet another embodiment, or between 500 ppm and 2000 ppm in another embodiment.

A reactor controlled in accordance with some embodiments of the invention can be an element of a staged reactor employing two or more reactors in series, wherein one reactor may produce, for example, a high molecular weight component and another reactor may produce a low molecular weight component.

A reactor controlled in accordance with the invention can implement a slurry or gas phase process in the presence of a bulky ligand metallocene-type catalyst system and in the absence of, or essentially free of, any scavengers, such as triethylaluminum, trimethylaluminum, tri-isobutylaluminum and tri-n-hexylaluminum and diethyl aluminum chloride, dibutyl zinc and the like. By "essentially free", it is meant that these compounds are not deliberately added to the reactor or any reactor components, and if present, are present to less than 1 ppm in the reactor.

A reactor controlled in accordance with the invention can employ one or more catalysts combined with up to 10 wt % of a metal-fatty acid compound, such as, for example, an aluminum stearate, based upon the weight of the catalyst system (or its components). Other metals that may be suitable include other Group 2 and Group 5-13 metals. In other embodiments, a solution of the metal-fatty acid compound is fed into the reactor. In other embodiments, the metal-fatty acid compound is mixed with the catalyst and fed into the reactor separately. These agents may be mixed with the catalyst or may be fed into the reactor in a solution or a slurry with or without the catalyst system or its components.

In a reactor controlled in accordance with some embodiments of the invention, supported catalyst(s) can be combined with activators and can be combined by tumbling and/or other suitable means, with up to 2.5 wt % (by weight of the catalyst composition) of an antistatic agent, such as an ethoxylated or methoxylated amine, an example of which is Kemamine AS-990 (ICI Specialties, Bloomington Del.). Other antistatic compositions include the Octastat family of compounds, more specifically Octastat 2000, 3000, and 5000.

Metal fatty acids and antistatic agents can be added as either solid slurries or solutions as separate feeds into the reactor. One advantage of this method of addition is that it permits on-line adjustment of the level of the additive.

Examples of polymers that can be produced in accordance with the invention include the following: homopolymers and copolymers of C2-C18 alpha olefins; polyvinyl chlorides; ethylene propylene rubbers (EPRs); ethylene-propylene diene rubbers (EPDMs); polyisoprene; polystyrene; polybutadiene; polymers of butadiene copolymerized with styrene; polymers of butadiene copolymerized with isoprene; polymers of butadiene with acrylonitrile; polymers of isobutylene copolymerized with isoprene; ethylene butene rubbers and ethylene butene diene rubbers; and polychloroprene; norbornene homopolymers and copolymers with one or more C2-C18 alpha olefin; terpolymers of one or more C2-C18 alpha olefins with a diene.

Monomers that can be present in a reactor controlled in accordance with the invention include one or more of: C2-C18 alpha olefins such as ethylene, propylene, and optionally at least one diene, for example, hexadiene, dicyclopentadiene, octadiene including methyloctadiene (e.g., 1-methyl-1,6-octadiene and 7-methyl-1,6-octadiene), norbomadiene, and ethylidene norbornene; and readily condensable monomers, for example, isoprene, styrene, butadiene, isobutylene, chloroprene, acrylonitrile, cyclic olefins such as norbomenes.

Fluidized bed polymerization (e.g., mechanically stirred and/or gas fluidized) reactions can be controlled in accordance with some embodiments of the invention. The reaction can be any type of fluidized polymerization reaction and can be carried out in a single reactor or multiple reactors such as two or more reactors in series.

In various embodiments, any of many different types of polymerization catalysts can be used in a polymerization process controlled in accordance with the present invention. A single catalyst may be used, or a mixture of catalysts may be employed, if desired. The catalyst can be soluble or insoluble, supported or unsupported. It may be a prepolymer, spray dried with or without a filler, a liquid, or a solution, slurry/suspension or dispersion. These catalysts are used with cocatalysts and promoters well known in the art. Typically these are alkylaluminums, alkylaluminum halides, alkylaluminum hydrides, as well as aluminoxanes. For illustrative purposes only, examples of suitable catalysts include Ziegler-Natta catalysts, Chromium based catalysts, Vanadium based catalysts (e.g., vanadium oxychloride and vanadium acetylacetonate), Metallocene catalysts and other single-site or single-site-like catalysts, Cationic forms of metal halides (e.g., aluminum trihalides), anionic initiators (e.g., butyl lithiums), Cobalt catalysts and mixtures thereof, Nickel catalysts and mixtures thereof, rare earth metal catalysts (i.e., those containing a metal having an atomic number in the Periodic Table of 57 to 103), such as compounds of cerium, lanthanum, praseodymium, gadolinium and neodymium.

In various embodiments, a polymerization reaction controlled in accordance with the invention can employ other additives, such as (for example) inert particulate particles.

It should be understood that while some embodiments of the present invention are illustrated and described herein, the invention is not to be limited to the specific embodiments described and shown.

What is claimed is:

1. A method for determining parameters for a transition from an initial reaction for producing a product whose properties meet an initial specification set, to a target reaction for producing the product with properties that meet a target specification set, said method including the steps of:
   (a) identifying, as a primary property, one of the product's properties that can cause production of more off-grade product during the transition than any of the other properties; and
   (b) determining initial conditions for the transition, including an initial value of the primary property, that reduce the amount of off-grade product produced during the transition.

2. The method of claim 1, wherein the initial conditions determined in step (b) at least minimize the amount of off-grade product produced during the transition.

3. The method of claim 2, also including the step of determining process control variables for implementing the transition commencing with the initial conditions determined in step (b).

4. The method of claim 2, also including the steps of:
   during performance of the initial reaction, establishing the initial conditions determined in step (b); and
   then, implementing the transition to the target reaction.

5. The method of claim 1, also including the step of determining process control variables for implementing the transition commencing with the initial conditions determined in step (b).

6. The method of claim 1, also including the steps of:
   during performance of the initial reaction, establishing the initial conditions determined in step (b); and
   then, implementing the transition to the target reaction.

7. The method of claim 1, wherein each of the initial reaction and the target reaction is a polymerization reaction.

8. The method of claim 7, wherein the product is a polyolefin.

9. The method of claim 1, wherein the product produced during the initial reaction and the target reaction is resin, and the primary property is one of resin density and a resin flow property.

10. The method of claim 1, also including the step of:
    determining process control variables for implementing the transition such that the product produced during the transition goes off-grade due to the primary property at a first time, and goes off-grade due to each of at least one non-primary product property at a time at least equal to the first time.

11. The method of claim 1, also including the step of:
    determining process control variables for implementing the transition commencing with the initial conditions determined in step (b) such that the product produced during the transition goes off-grade due to the primary property at a first time and goes off-grade due to each of at least one non-primary property of the product at a time at least equal to the first time, the primary property first complies with the target specification set at a second time, and at least one said non-primary property first complies with the target specification set at a time at least equal to but not later than the second time.

12. A method for determining parameters for a transition from an initial reaction for producing a product whose properties meet an initial specification set to a target reaction for producing the product with properties that meet a target specification set, including initial reaction parameters for commencing the transition and parameters for changing product parameters during the transition, wherein the properties of the product include a primary property that can cause production of more off-grade product during the transition than can any other of the properties, said method including the steps of:
(a) determining an initial value of the primary property, and a time constant for change of the primary property during the transition, that reduce the amount of off-grade product produced during the transition, cause the product produced during the transition to go off-grade due to the primary property at a first time, and cause the primary property to first comply with the target specification set at a second time; and
(c) determining an initial value for each of at least one non-primary property of the product, and a time constant for change of each said non-primary property during the transition, that cause the product produced during the transition to go off-grade due to each said non-primary property at a time at least equal to the first time.

13. The method of claim 12, wherein the initial value and the time constant determined in step (a) at least minimize the amount of off-grade product produced during the transition.

14. The method of claim 13, wherein each said initial value and each said time constant determined in step (c) cause each said non-primary property to first comply with the target specification set at a time at least equal to but not later than the second time.

15. The method of claim 13, also including the step of:
(d) implementing the transition by controlling process control variables such that the primary property has the initial value determined in step (a) at the start of the transition and such that the product produced during the transition goes off-grade due to the primary property at the first time and goes off-grade due to each said non-primary property at a time at least equal to the first time, the primary property first complies with the target specification set at the second time, and each said non-primary property first complies with the target specification set at a time at least equal to but not later than the second time.

16. The method of claim 13, wherein each of the initial reaction and the target reaction is a polymerization reaction.

17. The method of claim 16, wherein the product is a polyolefin.

18. A method for identifying a primary property of a product to be produced in a reactor with properties that meet an initial specification set, wherein after a transition the product is to be produced in the reactor with properties that meet a target specification set, said method including the steps of:
(a) obtaining data indicative of instantaneous and average values for each of at least two different properties of the product before, during, and after the transition, where each of said different properties is compliant with the initial specification set at the start of the transition; and
(b) identifying as the primary property, from said data, one of the different properties that can cause production of more off-grade product during the transition than can any other one of the properties.

19. The method of claim 18, wherein the reactor is a fluidized bed reactor configured to perform a polymerization reaction.

20. The method of claim 19, wherein the product is a polyolefin.

21. A method for determining parameters for a transition from an initial reaction for producing a product whose properties meet an initial specification set to a target reaction for producing the product with properties that meet a target specification set, including initial reaction parameters for commencing the transition and parameters for changing product parameters during the transition, wherein the properties of the product include a primary property, that can cause production of more off-grade product during the transition than can any other of the properties, and a secondary property, said method including the steps of:
(a) determining an initial value of the primary property, and a time constant for change of the primary property during the transition, that at least minimize off-grade product production during the transition, cause the product produced during the transition to go off-grade due to the primary property at a first time, and cause the primary property to first comply with the target specification set at a second time; and
(b) determining an initial value of the secondary property, and a time constant for change of the secondary property during the transition, that cause the product produced during the transition to go off-grade due to the secondary property at a third time and cause the secondary property to first comply with the target specification set at a fourth time; and
(c) determining operational parameters for implementing the transition.

22. The method of claim 21, wherein step (c) includes the step of determining the operational parameters such that the primary property changes in a manner consistent with the time constant determined in step (a), the secondary property changes in a manner consistent with the time constant determined in step (b), and instantaneous values of the primary property and the secondary property at the start of the transition are at least equal to the initial values determined in steps (a) and (b).

23. The method of claim 22, also including the step of:
(d) implementing the transition by controlling the operational parameters to set instantaneous values of the primary property and the secondary property at the start of the transition to be at least equal to the initial values determined in steps (a) and (b), changing instantaneous values of the primary property in a manner consistent with the time constant determined in step (a), and changing instantaneous values of the secondary property in a manner consistent with the time constant determined in step (b).

24. The method of claim 23, wherein each of the initial reaction and the target reaction is a polymerization reaction.

25. The method of claim 23, wherein the product is at least one polyolefin.

26. The method of claim 22, wherein the operational parameters include at least one of temperature, gas composition, comonomer composition, reactor pressure, catalyst composition, and catalyst modifier.

27. The method of claim 21, wherein the third time is equal to the first time and the fourth time is equal to but not later than the second time.

28. The method of claim 21, wherein the third time is equal to or later than the first time and the fourth time is not later than the second time.

29. The method of claim 28, wherein the product is a resin, the primary property is a resin flow property, and the secondary property is resin density.

30. The method of claim 21, wherein the product is a resin, the primary property is a resin flow property, and the secondary property is resin density.

31. The method of claim 21, wherein the operational parameters include at least one of temperature, gas composition, comonomer composition, reactor pressure, catalyst composition, and catalyst modifier.

* * * * *